United States Patent [19]

Person

[11] Patent Number: 4,933,826
[45] Date of Patent: Jun. 12, 1990

[54] CANCELLATION OF REGULATOR OUTPUT FILTER POLES BY SECOND DERIVATIVE FEEDBACK AND ERROR AMPLIFIER COMPENSATION

[75] Inventor: George A. Person, Phoenix, Ariz.

[73] Assignee: Bull HN Information Systems Inc., Phoenix, Ariz.

[21] Appl. No.: 401,259

[22] Filed: Aug. 31, 1989

[51] Int. Cl.$^5$ .............................................. H02M 1/14
[52] U.S. Cl. ....................................... 363/47; 363/48; 363/95
[58] Field of Search ................. 323/212, 213; 363/39, 363/47, 48, 74, 79, 95

[56] References Cited

U.S. PATENT DOCUMENTS

| | | | |
|---|---|---|---|
| 3,573,597 | 4/1971 | Genuit | 363/45 |
| 4,045,887 | 9/1977 | Nowell | 363/28 |
| 4,298,924 | 11/1981 | Genuit | 363/46 |
| 4,323,958 | 4/1982 | Nowell | 363/28 |

Primary Examiner—Patrick R. Salce
Assistant Examiner—Jeffrey Sterrett
Attorney, Agent, or Firm—J. H. Phillips; J. S. Solakian

[57] ABSTRACT

Instability resulting from the presence of reactive components in the output filter of regulated power supplies of the general type in which regulation is obtained by feeding back the output voltage to the regulator circuitry is eliminated by deriving a feedback signal from the output voltage which includes not only a direct component, but also separately derived first and second derivative components referenced to the reactive characteristics of a series output choke and parallel output capacitor of the output filter circuit. The amplitude ratios of the feedback signal components and the elements of the local feedback loop of the regulator error amplifier are selected in accordance with key aspects of the invention to eliminate the output filter (including the effective series resistance of the output filter capacitor) from the characteristic equation of the power supply to thereby eliminate instability whatever its source.

6 Claims, 4 Drawing Sheets

CANCELLATION OF REGULATOR OUTPUT FILTER POLES BY SECOND DERIVATIVE FEEDBACK AND ERROR AMPLIFIER COMPENSATION

FIELD OF THE INVENTION

This invention relates to the art of switching power supplies for producing regulated d-c at low voltages and high amperages and, more particularly, to switching power supplies which are regulated by a control circuit receiving a feedback voltage from the output.

BACKGROUND OF THE INVENTION

In many electronic systems, and particularly in data processing systems, there is always the need to provide regulated d-c voltages to the logic and other circuitry of the system. Typically, a switching regulated power supply is employed which receives raw d-c (which may have been rectified from a-c mains and filtered), chops this raw d-c (as by alternately enabling SCRs) at a rate much higher than the alternating rate of the mains (and typically ultrasonic), passes the chopped d-c through a step-down transformer (which, because of the switching frequency of the chopped d-c, need not be massive), rectifies the output from the step-down transformer and regulates and filters the rectified output to obtain a regulated output.

The regulation of switching power supplies is often achieved by feeding back the sensed output voltage to a control circuit in the switching apparatus itself. In switching regulated power supplies of this type, subtle (and even conspicuous) instabilities may occur in the form of oscillations resulting from the effects of feedback obtained from an output filter employing reactive (and thus phase shifting) components in conjunction with the operation of the regulator circuit. This condition (which can cause serious problems in the powered circuitry ranging from insidious intermittent errors to destruction) has been recognized and addressed in the prior art. See, for example, U.S. Pat. No. 4,298,924 (issued Nov. 3, 1981) to Luther L. Genuit, entitled SWITCHING REGULATOR WITH PHASE SHIFT SUBTRACTION, which describes a switching regulator incorporating the concept of employing a feedback voltage obtained by subtracting the phase shift voltage appearing across an output filter choke from the output voltage.

A more general approach has been to use attenuation-phase methods of rolling off the open loop gain of the regulator power amplifier to zero decibels with a phase margin of about 45°. (This technique has sometimes incorporated a first derivative component into the feedback voltage.)

In my co-pending application Ser. No. 07/390,016, filed Aug. 7, 1989, and entitled CANCELLATION OF REGULATOR OUTPUT FILTER POLES BY SECOND DERIVATIVE FEEDBACK, very effective switching power supply stabilization method and apparatus are disclosed and it is shown that the introduction of second derivative feedback, in proportions to first and zero derivative feedbacks in accordance with the method, substantially eliminates the output filter (the essential insidious instability culprit in well-designed switching power supplies) from the power supply circuit characteristic equation a if it has been physically removed. For many switching power supplies, incorporation of my invention described and claimed in the aboveidentified co-pending application will virtually eliminate instability.

However, it has been found that, in certain switching power supplies under certain conditions, subtle transient instability may still occur even if my above-referenced invention has been incorporated into the regulator circuitry. It is thus to the end of determining the source of such residual instability and to its elimination that the present invention is directed.

OBJECTS OF THE INVENTION

It is therefore a broad object of this invention to provide an improved switching regulated power supply.

It is another object of this invention to provide an improved switching regulated power supply of the type in which regulation is obtained by feeding back a signal derived from the output voltage to the regulator control circuit.

In a more specific aspect, it is an object of this invention to achieve improved stability in a switching regulated power supply by feeding back a signal derived from the output voltage to the regulator control circuit, which feedback signal includes both the first and second derivatives, as well as direct, components, the feedback signal components having predetermined amplitude ratios among one another, the regulator control circuit further incorporating certain compensation components in the error amplifier to remove any residual instability tendency attributable to the effective series resistance of the filter output capacitor.

From another perspective, it is an object of this invention to effectively eliminate the effect of the output filter in a switching regulated power supply in the characteristic loop equation, thereby insuring stability.

SUMMARY OF THE INVENTION

Briefly, these and other objects of the invention are achieved by deriving a feedback signal from the output voltage which includes not only a direct component, but also separately derived first and second derivative components referenced to the reactive characteristics of the series output choke and parallel output capacitor of the output filter circuit. The amplitude ratios of the feedback signal components and the elements of the local feedback loop of the regulator error amplifier are selected to eliminate the output filter (including the effective series resistance of the output filter capacitor) from the characteristic equation of the power supply to thereby eliminate instability whatever its source.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DETAILED DESCRIPTION OF THE INVENTION

It is important, for a full appreciation of the present invention, to have a complete understanding of the invention described and claimed in my above-identified co-pending application, and such will be first described after a discussion of the prior art and the environment in which either invention finds application.

Figure 1:
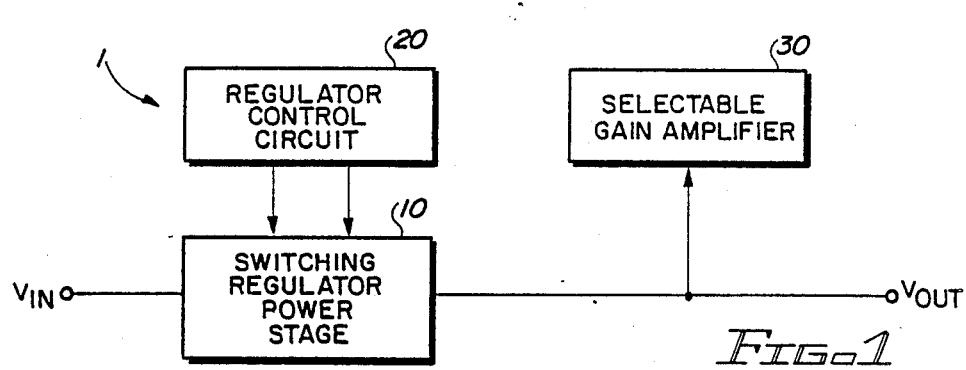
FIG. 1 is a functional block diagram of a switching regulated power supply of the type in which the present invention finds use.

Thus, referring to FIG. 1, there is shown a functional block diagram of a typical switching regulated power supply. A switching regulator power stage 10 performs the basic d-c to d-c conversion in the manner well known in the art. Thus, $V_{in}$ is an unregulated d-c voltage (which may have been obtained from the mains and a conventional rectifier/filter circuit, not shown) and $V_{out}$ is the regulated d-c voltage. The switching regulator power stage 10 may utilize a plurality of silicon controlled rectifiers (SCRs) coupled to the primary winding(s) of a step-down transformer in the conventional manner. A regulator control circuit 20 is provided for firing the SCRs individually at appropriate intervals of time, thereby applying current pulses (chopped d-c) from an input circuit through the transformer primary winding(s).

The regulator control circuit 20 provides a plurality of control signals, each one associated with a corresponding SCR, delivered in a sequence relating to the energy storage and discharge periods of the reactors constituting the transformer windings, such that an input current pulse can be provided to each of the plurality of primary windings at a time while another primary winding is discharging stored energy thereby resulting in overlapping current pulses being delivered by the secondary winding(s). The average output current is therefore the summation of current pulses through the primary windings as transferred to the secondary winding(s).

Overlapping of current pulses has the effect of increasing the duty cycle of the output current pulses, thereby reducing RMS ripple currents in the output circuit. The SCRs are fired individually and sequentially such that a next primary winding can be receiving an input current pulse while the reactor responding to a previously fired SCR is still transferring stored energy into a corresponding secondary winding. The regulator control circuit 20 controls the firing rate of the SCRs as required to regulate the output level, or output voltage, $V_{out}$. The firing rate will therefore vary with the loading of the switching regulator, the variation being determined by a portion of the $V_{out}$ signal fed back to the regulator control circuit 20 through a selectable gain amplifier 30. By varying the gain of the selectable gain amplifier 30, a varying factor, i.e., portion or multiple, of the $V_{out}$ signal is fed back to the control circuit 20, thereby causing $V_{out}$ to be regulated to a preselected value, the preselected value of $V_{out}$ being related to a preselected value of the gain of the selectable gain amplifier 30.

Figure 2:
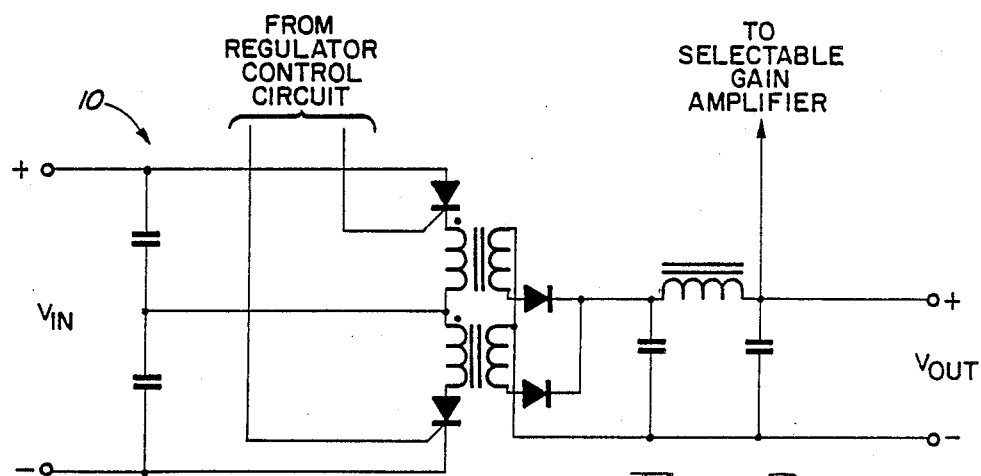
FIG. 2 is a simplified schematic of a switching regulator power stage of an exemplary type which may be stabilized by the use of the present invention.

FIG. 2 shows a schematic of the switching regulator power stage 10 utilized in one embodiment of the present invention. The switching regulator power stage 10 is more full described in U.S. Pat. No. 3,573,597 (issued Apr. 6, 1971) to Luther L. Genuit, entitled HIGH CURRENT SWITCHING REGULATOR WITH OVERLAPPED OUTPUT CURRENT PULSES, which is incorporated by reference herein.

Figure 3:
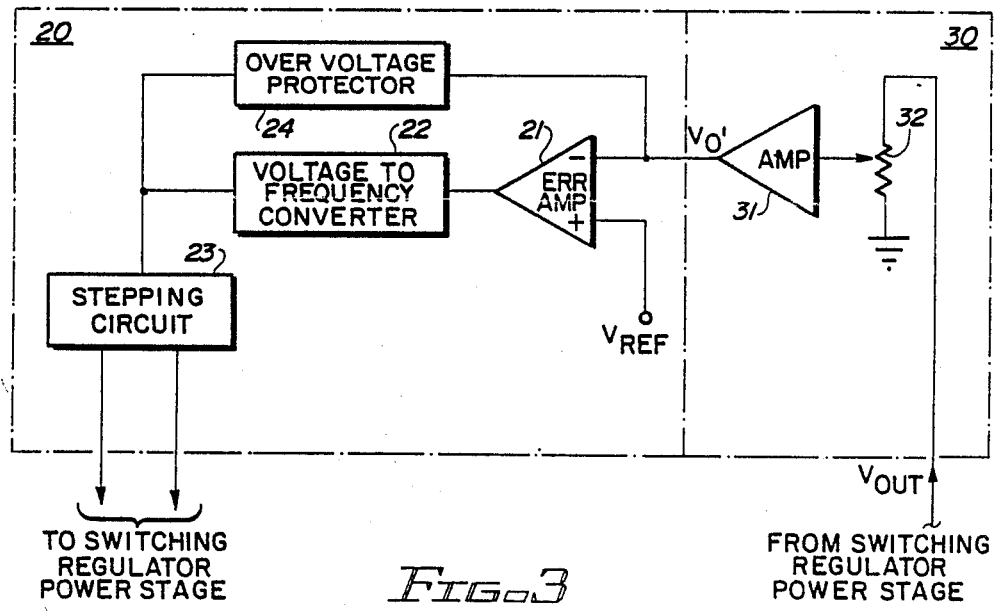
FIG. 3 is a block diagram of a prior art regulator control circuit used in conjunction with the power stage of FIG. 2.

Referring to FIG. 3, there is shown a logic block diagram of a typical prior art regulator control circuit 20 and selectable gain amplifier 30 which may be adapted for use in an exemplary embodiment of the present invention. The control circuit 20 comprises an error amplifier 21, a voltage-to-frequency converter 22 and a stepping circuit 23. An over-voltage protector circuit 24, and other "house-keeping" circuits, such as an undervoltage detection circuit, overcurrent protector detection circuit, etc. (not shown in detail) can be included in the control circuit 20 in the conventional manner.

The error amplifier 21 compares a predetermined portion or multiple ($V_o'$) of the switching regulator output voltage to a reference voltage ($V_{ref}$) and delivers an error voltage to the voltage-to-frequency converter 22. The voltage-to-frequency converter 22 generates a train of trigger pulses with a repetition rate that is proportional to the error voltage. The gating circuit 23 directs each enabling pulse to the appropriate SCR, the first pulse going to SCR 1, the second pulse going to SCR 2, the third pulse going to SCR 1, etc. The control circuit 20 may be of a type more fully described in U.S. Pat. No. 4,323,958 (issued Apr. 6, 1982) to John R. Nowell, entitled CIRCUIT FOR CONTROLLING THE SWITCHING FREQUENCY OF SCR REGULATORS, which is incorporated by reference herein. The over-voltage protector 24, which can be utilized in the control circuit 20, may be of a type more fully described in U.S. Pat. No. 4,045,887 (issued Sept. 6, 1977) to John R. Nowell, entitled SWITCHING REGULATOR CONTROL CIRCUIT, which is incorporated by reference herein. The variable gain amplifier 30 includes an amplifier 31 (which supplies $V_o$ to the error amplifier 21) and its attendant components, all as well known in the art. Thus, in the simplified configuration shown, the gain of amplifier 31 can be established, for example, by adjusting potentiometer 32 which, in turn, establishes the level of the output voltage by setting the nominal level of $V_o'$.

Briefly, then, the output voltage of the power supply is determined by the level of the voltage ($V_o'$), derived from the output voltage, applied to one input terminal of the error amplifier 21 as compared to the reference voltage applied to its other input terminal, the switching rate to the SCRs 1, 2 being dynamically adjusted as necessary to hold the output voltage constant under varying load conditions. Those skilled in the art will appreciate that an alternative configuration, often employed, is to use the error voltage to obtain switching signals which dynamically adjust the duty cycle of the individual SCRs, the switching frequency being held constant, in order to effect regulation. The present invention is applicable to both types of regulators, the configuration of FIG. 3 being selected as exemplary for the purpose of explaining the invention in detail.

Figure 4:
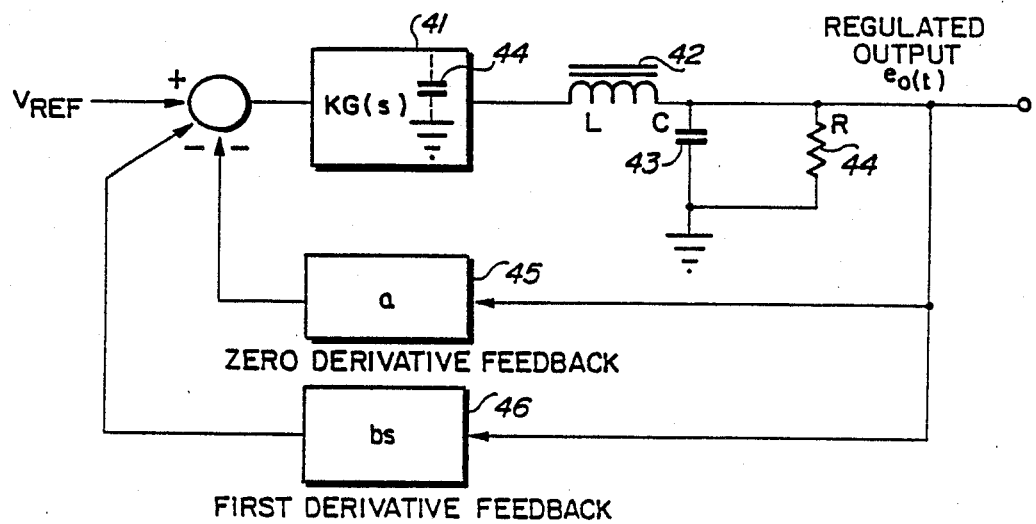
FIG. 4 is an analytical diagram of a switching regulated power supply according to the prior art and with reference to FIG. 3.

Attention is now directed to FIG. 4 which is an analytical diagram of a switching regulated power supply according to the prior art. As previously mentioned, the prior art, somewhat intuitively, contemplates the incorporation of feeding back a first derivative component, as well as a direct component, of the output voltage in order to "anticipate" the need for quick change in the switching circuit as, for example, when the full load is thrown onto the power supply after a no-load condition or whenever any other substantial and fast change in the load is encountered. This first derivative feedback component is included in the analytical diagram of FIG. 4 in which the block 41, labeled KG(s), includes the gain and frequency sensitive terms prior to the choke 42 and output capacitor 43 components of the output filter, but including the input capacitor component 44 if the output filter is in the traditional Pi configuration. Those skilled in the art will understand that the input filter capacitor 44 functions in a manner that can be considered a current-to-voltage converter properly belonging, for purposes of analytical analysis, within the block 41. Thus, the direct ("zero derivative") feedback component is $ae_o(t)$ where "a" is an amplification constant applied in the block 45 (equivalent to the amplifier 31 of FIG. 3) and is set to obtain the desired output voltage. Similarly, the first derivative component $b\, de_o(t)/df$ may be utilized in which "b" is an amplification constant applied in the block 46 (after passing $e_o$ through a differentiating circuit) and is set more or less according to the experience of the circuit designer to obtain the desired degree of load change "anticipation".

It can be shown that, for an output filter including the series choke 42 (having value L expressed in henries) and the output capacitor 43 (having a value C expressed in farads) disposed in parallel with the load (represented in FIG. 4 by resistor 47) R, the characteristic equation $E_o(s)/E_{in}(s)$ across the output filter only is:

$$E_o(s)/E_{in}(s) = \Omega_o^2/S^2 + 2\Omega_o S + \Omega_o^2$$

where:
$\Omega hd\, o$ is $1/\sqrt{LC}$
and:
is the damping factor (typically about 0.5).

Now, consider the inherent stability of the entire circuit of FIG. 4 for which the characteristic equation (return difference set =0) is:

$$1+((KG(s))(\Omega_o^2)(a+bS))/(S^2+2\Omega_o S+\Omega hd\, o^2)=0$$

It will be immediately seen that conditions of instability still exist as evidenced by the ongoing presence of the $S^2+2\Omega_o S+\Omega_o^2$ terms which constitute, usually, a pair of complex conjugate poles in the 'S' plane. Such poles tend to make the loop more prone to oscillatory-like response to rapidly changing demands on the power supply output current/voltage. Restated more simply, feedback remains which is of the sort which can lead to oscillations.

Figure 5:
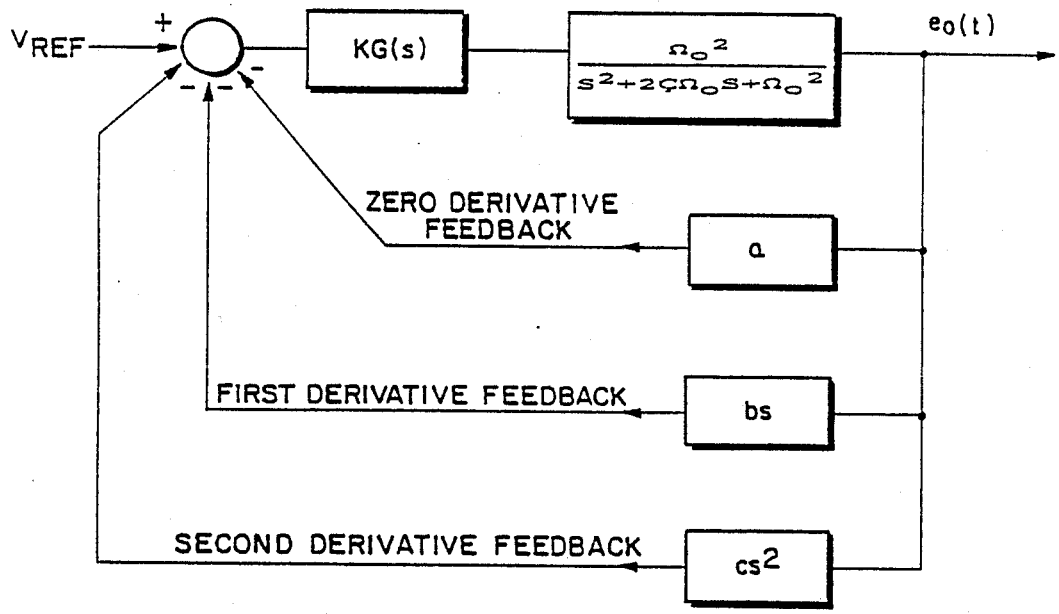
FIG. 5 is an analytical diagram of a switching regulated power supply incorporating zero, first and second derivative feedback according to the invention described and claimed in my above-identified co-pending application, reference being taken to FIG. 6.

Attention is now directed to FIG. 5 which is an analytical diagram similar to FIG. 4, but in which the output filter is represented by its characteristic equation component of the characteristic equation of the entire circuit and in which a second derivative feedback has been introduced. Thus, the circuit characteristic equation is:

$$1+((KG(s))(\Omega_o^2)(a+bS+cS^2))/(S^2+2\Omega_o S+\Omega_o^2)=0$$

If c is factored:

$$1+((KG(s))(\Omega_o^2)(c)((a/c)+(b/c)S+S^2))/(S^2+2\Omega_o S+\Omega_o^2)=0$$

Now, consider the effect on the characteristic equation if $2\Omega_o$ and b/c are equalized and if $\Omega_o^2$ and a/c are equalized; then the characteristic equation becomes:

$$1+KG(s)\Omega_o^2 c=0$$

It will be seen that, if these ratios among a, b and c are established and preserved, the effect of the output filter on the characteristic equation, and consequently its contribution toward instability, is eliminated. For purposes of analysis, it is as if the output filter, the essential insidious instability culprit in well-designed switching power supplies, had been physically removed.

There are many ways of realizing the benefits of the this approach in practical circuitry. One simplified straightforward arrangement is presented in FIG. 6. As previously described in conjunction with FIG. 3, the output voltage $V_{out}$ is applied, through potentiometer 32, to the input of amplifier 31 which serves to establish the value of "a" and hence the value of $V_{out}$. (In practice, of course, $V_{out}$ would be observed and potentiometer adjusted to obtain the desired output voltage, the value of "a" naturally following.) The output from amplifier 31 is applied to summing circuit 51 whose output is applied to one input of differential amplifier 21 which has the reference voltage applied to its other input in the manner previously described except for the intermediate presence of the summing circuit 51. $V_{out}$ is also passed through a first differentiator made up of the combination of series capacitor 52 and parallel resistor 53, the output from the first differentiator being applied to the input of buffer amplifier 54. Therefore, the output from buffer amplifier 54 is the first derivative of the output voltage, and this signal is applied, through potentiometer 55, to amplifier 56. In addition, the output from buffer amplifier 54 is also applied to a second differentiator made up of the combination of series capacitor 57 and parallel resistor 58, the output from the second differentiator being applied to the input of buffer amplifier 59. Therefore, the output from buffer amplifier 59 is the second derivative of the output voltage, and this signal is applied, through potentiometer 60, to amplifier 61. The output signals from the buffer amplifiers 56 and 61, like the output from the amplifier 31, are applied to inputs of the summing circuit 51 such that the summed output from the summing circuit includes all three components.

This alone will not guarantee elimination of instability; rather, as discussed above, the correct ratios for the gain constants "a", "b" and "c" must be established and maintained. Since the gain constant "a" is set by adjustment of potentiometer 32, the relationships developed above may be employed to set "b" and "c". More particularly:

$$c = a/\Omega_o^2 = aLC$$

and $$b = 2\Omega_o c = 2a\sqrt{LC}$$

When the gain constants "b" and "c" are thus set, the power supply will act as if the phase shifting components in the output filter have been eliminated and will therefore exhibit corresponding stability.

Figure 6:
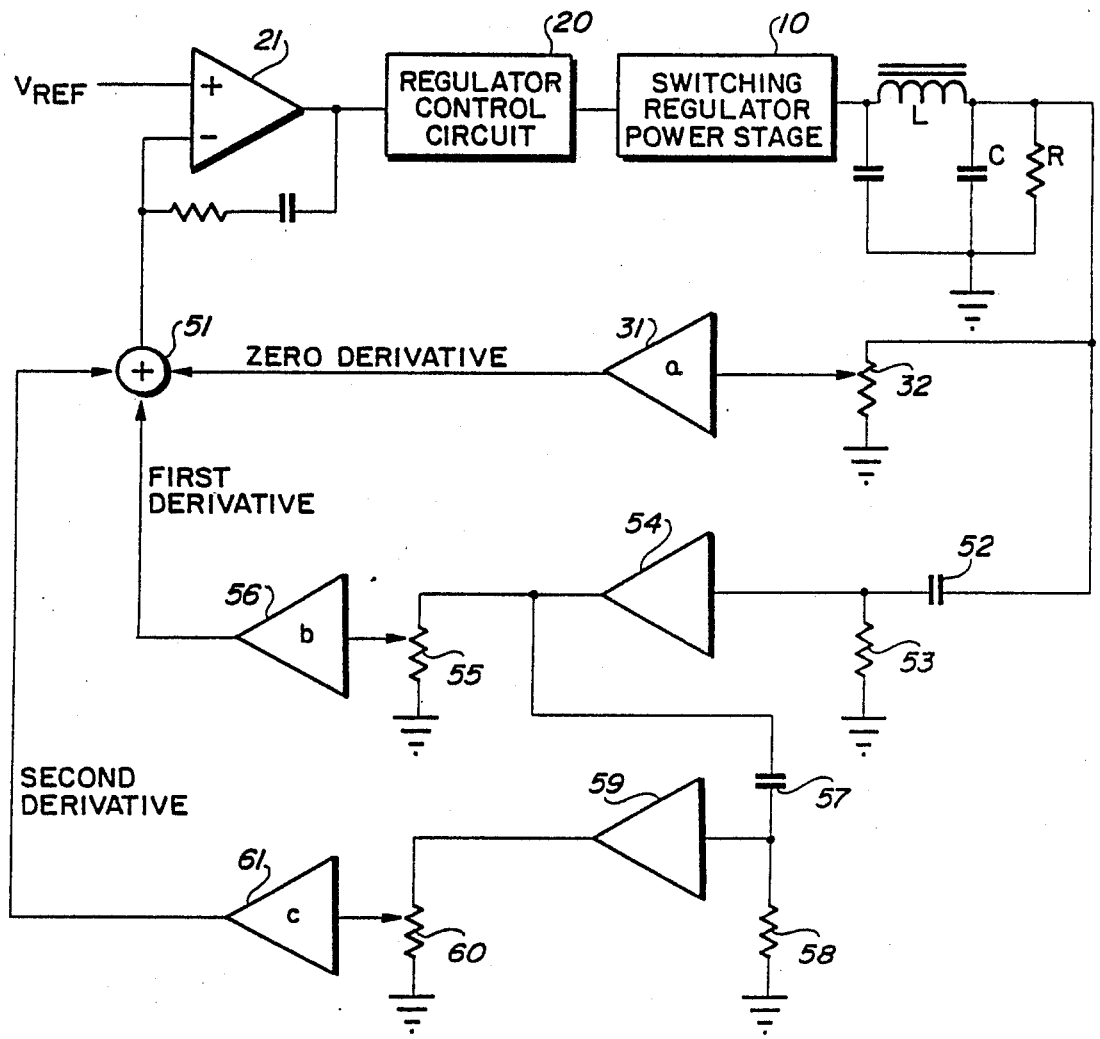
FIG. 6 is a partially schematic block diagram of a regulator control circuit similar to FIG. 3 and in accordance with the invention described and claimed in my above-identified co-pending application as it would be adapted for use in conjunction with the power stage of FIG. 2.

The circuit of FIG. 6 is only one of many modes which may be employed to obtain and apply the zero first and second derivatives of the output voltage in the correct ratios according to the present invention. It may be noted that the feedback voltage obtained by Genuit in the invention described in previously referenced U.S. Pat. No. 4,298,924 includes first and second derivative components, but not in the important correct ratios which obtain the effective elimination of the output filter from the characteristic equation of the power supply.

The description to this point relates principally to the invention disclosed and claimed in my above-referenced co-pending application Ser. No. 07/390,016. As previously discussed, the correct application of the method of that invention is directed to the substantial elimination of the output filter (and hence its phase shifting components) from the power supply circuit characteristic equation as if it had been physically removed. For many switching power supplies, incorporation of the principles of that invention into the regulator will virtually eliminate instability.

However, in the practice of that invention, the assumption is made that the effective series resistance (ESR) of the output filter capacitor is sufficiently small such that it has no practical effect on the circuit characteristic equation. That assumption is valid so long as certain high quality output filter capacitors that exhibit very low ESR (for example, on the order of one milliohm) are employed. However, when the output filter capacitor's self time constant, ESR * C, produces a rising gain with frequency characteristic for error amplifier gains greater than unity, then the ESR * C effect must be taken into account.

Figure 7:
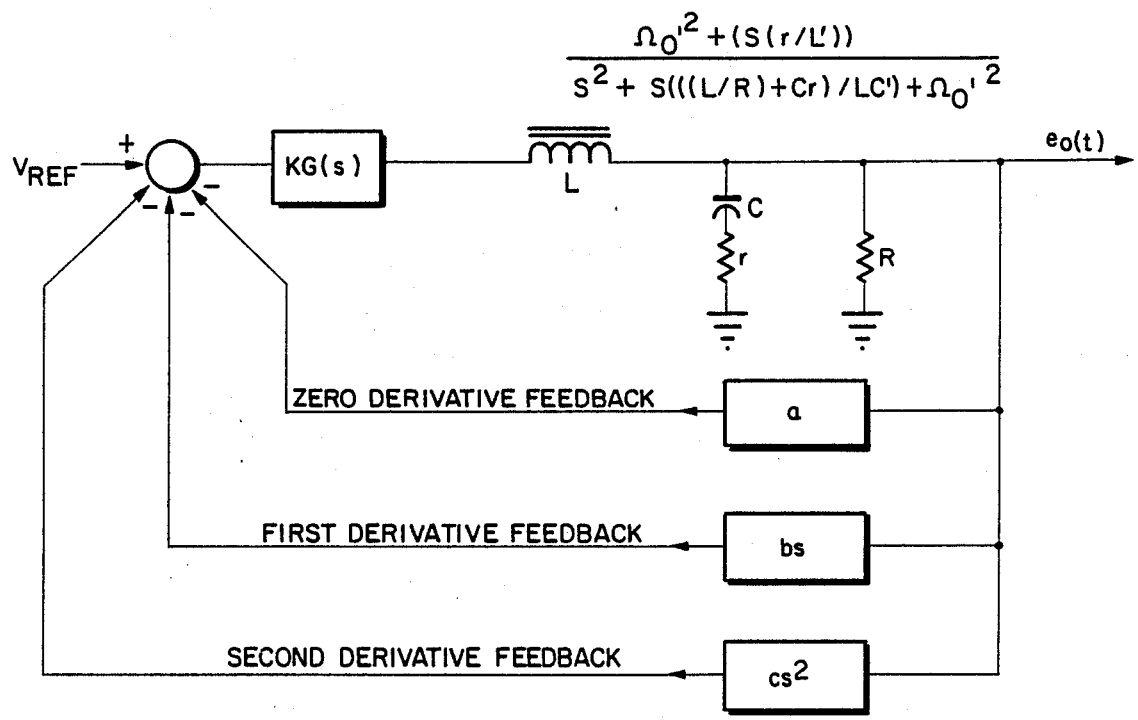
FIG. 7 is an analytical diagram of a switching regulated power supply incorporating zero, first and second derivative feedback and in which the ESR of the output filter capacitor is sufficiently high as to cause potential instability notwithstanding the best adjustment to the gain ratios among the feedback amplifiers.

Thus, consider the power supply characteristic equation factor attributable to the output filter shown in FIG. 7 in which it will be seen that the output capacitor C has rohms as its ESR:

$$\frac{((r + 1/SC)R)/(R + r + (1/SC))}{SL + ((r + (1/SC))R/(R + r + (1/SC)))} \text{ or }$$

$$\frac{(r + 1/SC)R}{SL(R + r) + (L/C) + ((r + (1/SC)R)} \text{ or }$$

$$\frac{(1 + SCr)R}{S^2LC(R + r) + SL + (SCr + 1)R} \text{ or }$$

$$\frac{1 + SCr}{S^2LC((R + r)/R) + S((L/R) + Cr) + 1} \text{ or }$$

$$\frac{1/(LC(R + r)/R) + Sr/(L(R + r)/R)}{S^2 + S(((L/R) + Cr)/(LC(R + r)/R)) + 1/(LC(R + r)/R)}$$

Now, let:

$$L' = L((R+r)/R)$$

$$C' = C((R+r)/R)$$

$$\Omega_0'^2 = 1/(LC(R+r)/R)$$

$$\Omega_0' = \sqrt{\Omega_0'^2} = 1/(\sqrt{LC} \sqrt{(R + r)}/R = 1/\sqrt{LC}$$

Thus, the power supply characteristic equation component attributable to the output filter can be expressed as:

$$\frac{\Omega_0'^2 + (S(r/L'))}{S^2 + S(((L/R) + Cr)/LC') + \Omega_0'^2}$$

and the characteristic equation of the power supply can be expressed as:

$$1 +$$

$$\frac{(KG(S)((\Omega_0'^2/\Omega_0'^2) + ((S(r/L'))/\Omega_0'^2)(cS^2 + bS + a)))\Omega_0'^2}{S^2 + S(((L/R) + Cr)/LC') + \Omega_0'^2}$$

$$= 0$$

Now, if it is assumed that $(R+r)/R \approx 1$ (i.e., $R >> r$) and the ratios among a, b and c are established as follows:

$$a = 1$$

$$b = (L/R) + Cr$$

$$c = 1/\Omega_0'^2 = LC(R+r)/R$$

then the power supply characteristic equation becomes:

$$1 + (KG(S))(1 + SrC) = 0$$

It will therefore be seen that if the ESR of C is sufficiently high that it must be taken into account, the best adjustment available to a, b and c will not, alone, eliminate the influence of the output filter on the power supply characteristic equation; potential instability remains because of the residual presence of the (1+SrC) factor. That this potential instability is significant is shown as follows.

Figure 8:
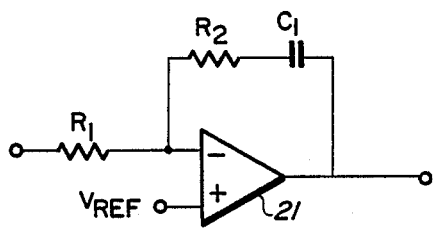
FIG. 8 is a representation of the regulator error amplifier configured for analytical purposes.
Figure 9:
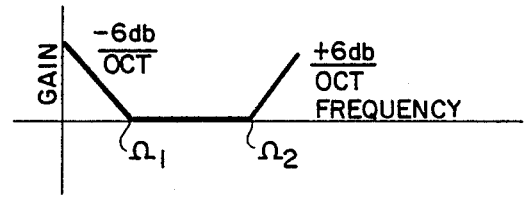
FIG. 9 is a Bode plot of the frequency response of the power supply illustrated in FIG. 7.

The KG(S) factor in the power supply characteristic equation is determined fundamentally by the error amplifier 21 as shown in FIG. 6, and a conventional representation of the error amplifier configured for analytical purposes is shown in FIG. 8. As those skilled in the art will understand, the gain characteristic of the error amplifier of FIG. 8 is:

$$KG(S) = (1 + SC_1R_2)/SC_1R_1$$

where $R_1$ is the input resistance of the error amplifier along with any added lump resistance and C1 and R2 are the actual values of the feedback components. Consequently, the power supply characteristic equation becomes:

$$1+((1+SC_1R_2)/SC_1R_1)(1+SrC)=0$$

whose Bode plot is shown in FIG. 9, the increasing-gain-with-increasing- frequency characteristic curve region above $\Omega_2$ (i.e., $1/rC$) indicating potentially serious instability which, as stated above, cannot be compensated with the best adjustment among a, b and c.

Figure 10:
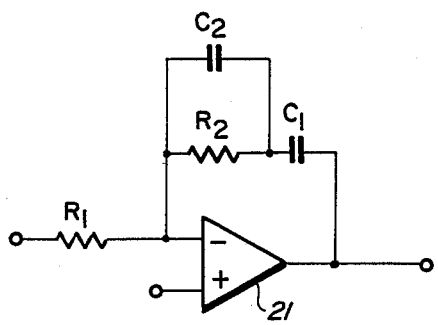
FIG. 10 is a representation of the regulator error amplifier configured for analytical purposes and modified in accordance with the present invention.

Consider, however, the modified error amplifier shown in FIG. 10 in which there has been added another capacitor $C_2$ disposed in parallel with $R_2$ in the feedback loop. The transfer function of the error amplifier is now:

$$KG(S)=((1/SC_1)+((R_2/SC_2)/(R_2+(1/SC_2))))/R_1$$
or
$$KG(S)=((1/SC_1)+(R_2/(1+SC_2R_2)))/R_1 \text{ or}$$

$$KG(S) = \frac{1 + S(C_2R_2 + C_1R_2)}{SR_1C_1(1 + SC_2R_2)}$$

and the power supply characteristic equation therefore becomes:

$$1 + \frac{1 + S(C_2R_2 + C_1R_2)}{SR_1C_1(1 + SC_2R_2)}(1 + SrC) = 0$$

Consider further the effect of setting $rC$ equal to $C_2R_2$. Then, the power supply characteristic equation becomes:

$$1 + \frac{1 + S(C_2R_2 + C_1R_2)}{SR_1C_1} = 0$$

Figure 11:
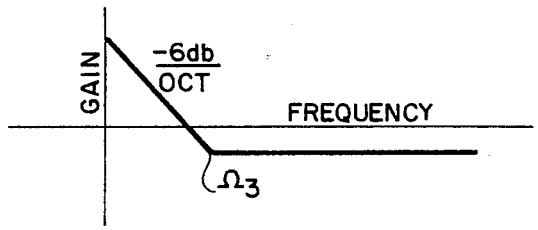
FIG. 11 is a Bode plot of the frequency response of the power supply of FIG. 7 incorporating the modified regulator error amplifier illustrated in FIG. 11.

It will be seen that the $(1+SrC)$ factor has been eliminated, and, with reference to the Bode plot of FIG. 11, that the $\Omega_3$ term $1+S(C_2R_2+C_1R_2)$ describes a crossover frequency at which the typical decreasing-gain-with-increasing-frequency region joins a flat frequency response region, the increasing-gain-with-increasing-frequency region present in FIG. 9 having been completely eliminated. Consequently, the effect of the power supply output filter has been eliminated even though a output filter capacitor having relatively high ESR has been employed.

The invention, once understood, is readily practiced. Referring to FIG. 10, assume the following reasonable, real world component values:

$r = 0.005$ ohms $C = 50,000$ μfarads $\Omega_3 = 15000$ radians/second $R_2 = 1000$ ohms Then:

$rC = 250 \times 10^{-6} = C_2R_2$

In addition, if $R_1C_1 > (C_1+C_2)R_2$, then the error amplifier gain at high frequencies can be less than unity, so it is useful to establish this secondary relationship in a practical circuit.

Now:

$C_2 = rC/R_2 = (250 \times 10^{-6})/10^3 = 250$ μfarads;

thus:

$R_2C_1 + R_2C_2 = 1/(15 \times 10)^3 = 66.7$ μseconds;

$R_2C_1 = (66.7 - 50)$ μseconds $= 16.7$ μseconds;

therefore:

$C_1 = 16.7 \times 10^{-6}/10^3 = 16,700$ picofarads.

Also,:

$R_1C_1 > (C_1+C_2)R_2 = 66.7$ μseconds;

$R_1 > (66.7 \times 10^{-6})/(16700 \times 10^{-12}) = 3994$ ohms.

Therefore, if $R_1$ is some reasonable value greater than 3994 ohms, say 10,000 ohms, then the frequency response represented in the Bode plot of FIG. 11 above $\Omega_3$ will be flat. Consequently, the combination of providing zero, first and second derivative feedback in the proper ratios and especially selecting the response of the error amplifier results in the elimination of the output filter from the power supply characteristic equation, notwithstanding the fact that the output filter capacitor ESR is sufficiently high as to contribute significantly to the equation.

It may be further noted that the use of the invention is not necessarily limited to switching regulated power supplies, but may also be employed in any regulated power supply utilizing an output filter including a series choke and parallel capacitor and feedback of the output voltage to the control circuit.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In the method of regulating a power supply driving a load of value R ohms, which power supply incorporates a series choke of value L henries and a parallel output capacitor of value C farads (and having an effective series resistance of r ohms) in an output filter having a damping factor, which method includes the step of feeding back a selected multiple "a" of the output voltage appearing across the output capacitor to a control circuit for comparison with a reference voltage and responsive correction, which control circuit includes an error amplifier, the improvement wherein:

(A) there is also fed back to the control circuit the first derivative of the output voltage in the multiple "b";

(B) there is also fed back to the control circuit the second derivative of the output voltage in the multiple "c";

(C) the frequency/gain characteristic of the error amplifier is adjusted to be flat above a predetermined crossover frequency; and (D) the ratios among "a", "b" and "c" are selected to eliminate the factors contributed by the output filter from the power supply characteristic equation.

2. The method of claim 1 in which the frequency/-gain characteristic of the error amplifier is adjusted to be decreasing-gain-with-increasing-frequency below the crossover frequency.

3. In the method of regulating a power supply driving a load of value R ohms, which power supply incorporates a series choke of value L henries and a parallel output capacitor of value C farads (and having an effective series resistance of r ohms) in an output filter having a damping factor, which method includes the step of feeding back a selected multiple "a" of the output voltage appearing across the output capacitor to a control circuit for comparison with a reference voltage and responsive correction, which control circuit includes an error amplifier, the improvement wherein:

(A) there is also fed back to the control circuit the first derivative of the output voltage in the multiple "b" in which:

$b = (L/R) + Cr$;

(B) there is also fed back to the control circuit the second derivative of the output voltage in the multiple "c" in which:

$c = LC(R+r)/R$;

(C) the error amplifier has:
  (1) a crossover frequency $\Omega_3$ in radians per second;
  (2) an input impedance of value $R_1$ ohms; and
  (3) a feedback loop including a feedback resistor of value $R_2$ ohms disposed in series with a first feedback capacitor of value $C_1$ farads, the feedback loop further including a second feedback capacitor of value $C_2$ farads, the second feedback capacitor being disposed in parallel with the feedback resistor;

and wherein the value relationship among the components is given by:

(D) $\Omega_3 = (C_2 R_2 + C_1 R_2)/R_1 C_1$ and (E) $C_2 R_2 = rC$.

4. The method of claim 3 in which the relationship among the components is further defined by: $R_1 C_1 > (C_1 + C_2) R_2$.

5. In a regulated power supply driving a load of value R ohms, incorporating a series choke of value L henries and a parallel output capacitor of value C farads (and having an effective series resistance of r ohms) in an output filter and which includes zero derivative means for feeding back a selected multiple "a" of the output voltage appearing across said output capacitor to a control circuit, said control circuit including an error amplifier, for comparison with a reference voltage and responsive correction, the improvement wherein said regulated power supply further includes:

(A) first derivative feedback means adapted to feed back to said control circuit the first derivative of the output voltage in the multiple "b" in which:

$b = (L/R) + Cr$;

and (B) second derivative feedback means adapted to feed back to said control circuit the second derivative of the output voltage in the multiple "c" in which:

$c = LC(R+r)/R$;

(C) said error amplifier is characterized by:
  (1) a crossover frequency $\Omega_3$ in radians per second;
  (2) an input impedance of value $R_1$ ohms; and
  (3) feedback loop comprising a feedback resistor of value $R_2$ ohms disposed in series with a first feedback capacitor of value $C_1$ farads, said feedback loop further comprising a second feedback capacitor of value $C_2$ farads, said second feedback capacitor being disposed in parallel with said feedback resistor;

and wherein the value relationship among the components is given by:

(D) $\Omega_3 = (C_2 R_2 + C_1 R_2)/R_1 C_1$ and (E) $C_2 R_2 = rC$.

6. The regulated power supply of claim 5 in which the relationship among the components is further defined by: $R_1 C_1 > (C_1 + C_2) R_2$.

* * * * *